(12) United States Patent
Belitzer

(10) Patent No.: US 12,429,553 B2
(45) Date of Patent: Sep. 30, 2025

(54) FMCW RADAR

(71) Applicant: Infineon Technologies AG, Neubiberg (DE)

(72) Inventor: Alexander Belitzer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 348 days.

(21) Appl. No.: 17/930,267

(22) Filed: Sep. 7, 2022

(65) Prior Publication Data

US 2023/0097888 A1   Mar. 30, 2023

(30) Foreign Application Priority Data

Sep. 27, 2021  (EP) .................................. 21199046

(51) Int. Cl.
| | | |
|---|---|---|
| *G01S 7/02* | (2006.01) | |
| *G01S 13/58* | (2006.01) | |
| *G01S 13/931* | (2020.01) | |
| *H04B 1/10* | (2006.01) | |

(52) U.S. Cl.
CPC ............ *G01S 7/023* (2013.01); *G01S 13/584* (2013.01); *G01S 13/931* (2013.01)

(58) Field of Classification Search
CPC ...... G01S 7/023; G01S 13/584; G01S 13/931; G01S 7/03; G01S 13/343; G01S 2013/9321; G01S 2013/93271; G01S 7/02; G01S 7/28; G01S 13/0218; G01S 7/4004; G01S 13/345; G01S 13/347; G01S 7/352; G01S 7/40; G01S 13/32; G01S 7/021; G01S 7/23; G01S 7/288; G01S 13/209; G01S 13/218; G01S 13/272; G01S 13/348; G01S 13/34; G01S 13/36; G01S 13/88; G01S 13/932; G01S 13/9306; G01S 7/35; G01S 7/355; G01S 7/36; G01S 13/288; H04B 1/1027; H04B 1/458; H04B 1/123; H04B 1/126; H01P 5/12; H01P 5/16; H01P 5/18; H01P 11/00; H03H 7/46; H03H 7/48
USPC .................. 342/442, 159, 165, 195; 455/296
See application file for complete search history.

(56) References Cited

U.S. PATENT DOCUMENTS

| | | | |
|---|---|---|---|
| 4,612,549 A | | 9/1986 | Geyer, Jr. et al. |
| 5,117,505 A | * | 5/1992 | Talwar ................... H04B 1/126 455/278.1 |
| 6,121,918 A | | 9/2000 | Tullsson |
| 7,843,375 B1 | | 11/2010 | Rennie et al. |

(Continued)

FOREIGN PATENT DOCUMENTS

| | | |
|---|---|---|
| EP | 1672379 A2 | 6/2006 |
| EP | 3502732 A1 | 6/2019 |

*Primary Examiner* — Vladimir Magloire
*Assistant Examiner* — Remash R Guyah
(74) *Attorney, Agent, or Firm* — Harrity & Harrity, LLP

(57) ABSTRACT

A radar system and a corresponding method for a radar system are described herein. In accordance with one example, the method includes receiving—via a first RF port of a coupler—an antenna signal from an antenna, receiving—with an auxiliary receiver—a representation of the antenna signal via a second RF port of the coupler, and generating—with the auxiliary receiver—an auxiliary base-band signal from the representation of the antenna signal. Based on the auxiliary base-band signal, an external radar interference signal transmitted from an external radar device incident at the antenna is detected.

22 Claims, 6 Drawing Sheets

(56) References Cited

U.S. PATENT DOCUMENTS

| | | | |
|---|---|---|---|
| 9,431,997 B1* | 8/2016 | Comeau | H04B 1/1009 |
| 2011/0050484 A1 | 3/2011 | Nakanishi | |
| 2016/0291130 A1 | 10/2016 | Ginsburg et al. | |
| 2019/0181902 A1* | 6/2019 | Kollmann | H01P 5/12 |
| 2019/0181964 A1* | 6/2019 | Christoffers | H04B 17/19 |
| 2019/0235051 A1* | 8/2019 | Melzer | G01S 7/032 |
| 2019/0293749 A1* | 9/2019 | Itkin | G01S 13/931 |
| 2019/0317187 A1 | 10/2019 | Meissner et al. | |
| 2019/0377077 A1* | 12/2019 | Kitayama | G01S 7/0232 |
| 2020/0088838 A1* | 3/2020 | Melzer | G01S 7/352 |

* cited by examiner

FMCW RADAR

CROSS REFERENCE TO RELATED APPLICATION

This application claims priority to European Patent Application No. 21199046.0 filed on Sep. 27, 2021, the content of which is incorporated by reference herein in its entirety.

TECHNICAL FIELD

The present disclosure relates to the field of radar sensors, in particular to radar sensing techniques that allow the detection of interfering radio frequency (RF) signals.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of advanced driver assistive systems include "adaptive cruise control" (ACC) and "radar cruise control" systems. Such systems may be used to automatically adjust the speed of an automobile so as to maintain a safe distance from other automobiles driving ahead. Other examples of advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated RF circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as "chirps". In case of linear chirp signals the term "LFM signals" is sometimes used, wherein LFM stands for "linear frequency modulation". A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

As more and more automobiles are being equipped with radar sensors, interference is becoming an issue. That is, the radar signal radiated by a first radar sensor (installed in one automobile) may intersperse to the reception antenna of a second radar sensor (installed in another automobile) and impair the operation of the second radar sensor. The inventors have identified the need for improvement of the interference detection in radar systems. Accordingly, the problem addressed by the examples described herein is the improvement of the interference detection in radar systems.

SUMMARY

The problem mentioned above is solved by the radar system of claim 1 and the method of claim 10. Various examples and further developments are covered by the dependent claims.

A radar system is described herein. In accordance with one example, the system comprises a radio frequency (RF) coupler that has a first RF port for receiving an RF antenna from an antenna, a second RF port configured to output a representation of the RF antenna signal, and a third RF port. The system further includes an auxiliary receiver channel having an RF input coupled to the second RF port of the RF coupler. The auxiliary receiver channel is configured to receive the representation of the RF antenna signal and is configured to generate an auxiliary base-band signal based on the representation of the RF antenna signal. Moreover, the system includes a detection circuit configured to detect, based on the auxiliary base-band signal, an external radar interference signal transmitted from an external radar device and incident at the antenna.

Further, a method for a radar system is described herein. In accordance with one example, the method includes receiving—via a first RF port of a coupler—an antenna signal from an antenna, receiving—with an auxiliary receiver—a representation of the antenna signal via a second RF port of the coupler, and generating—with the auxiliary receiver—an auxiliary base-band signal from the representation of the antenna signal. Based on the auxiliary base-band signal, an external radar interference signal transmitted from an external radar device incident at the antenna is detected.

BRIEF DESCRIPTION OF THE DRAWINGS

The implementation can be better understood with reference to the following drawings and descriptions. The components in the figures are not necessarily to scale; instead emphasis is placed upon illustrating the principles of the implementation. In the figures, like reference numerals designate corresponding parts. In the drawings.

DETAILED DESCRIPTION

Figure 1:
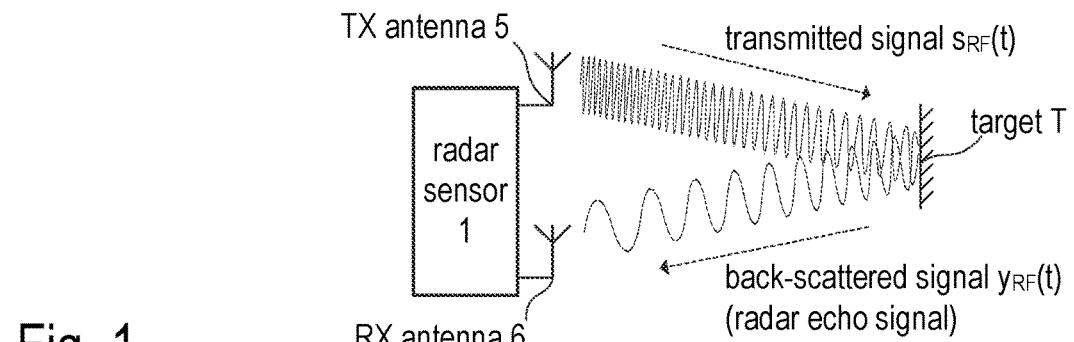
FIG. 1 is a sketch illustrating the operating principle of an FMCW radar system for distance and/or velocity measurement.

FIG. 1 illustrates a frequency-modulated continuous-wave (FMCW) radar sensor 1. In the present example, separate transmission (TX) and reception (RX) antennas 5 and 6, respectively, are used (bistatic or pseudo-monostatic radar configuration). However, it is noted that a single antenna can also be used, in which case the reception antenna and the transmission antenna will be physically the same (monostatic radar configuration). The transmission antenna 5 (quasi-) continuously radiates a radio frequency (RF) signal $s_{RF}(t)$ which is frequency-modulated, for example, by a saw-tooth-shaped signal. When the radiated signal $s_{RF}(t)$ is back-scattered at an object T, which may be located in the radar channel within the measurement range of the radar device (e.g. within the radar system's "field of view"), the back-scattered signal $y_{RF}(t)$ is received by the reception antenna 6. The object T is usually referred to as "radar target".

In a more general example, more than one target may be in the field of view of a radar sensor, and an antenna array may be used instead of a single RX antenna. Similarly, an antenna array may be used instead of a single TX antenna. Using multiple RX and TX antennas in a multi-channel radar system allows for the measurement of the angle of incidence of a radar echo, usually referred to as direction of arrival (DoA). Measuring the direction of arrival can be used for many applications, and thus most radar sensors may make use of antenna arrays. To keep the drawings simple, only one TX antenna and one RX antenna (and respective TX and RX channels) are shown in the figures. It is understood that the concepts described herein are readily applicable to multi-channel radar sensors with antenna arrays, as well.

Figure 2:
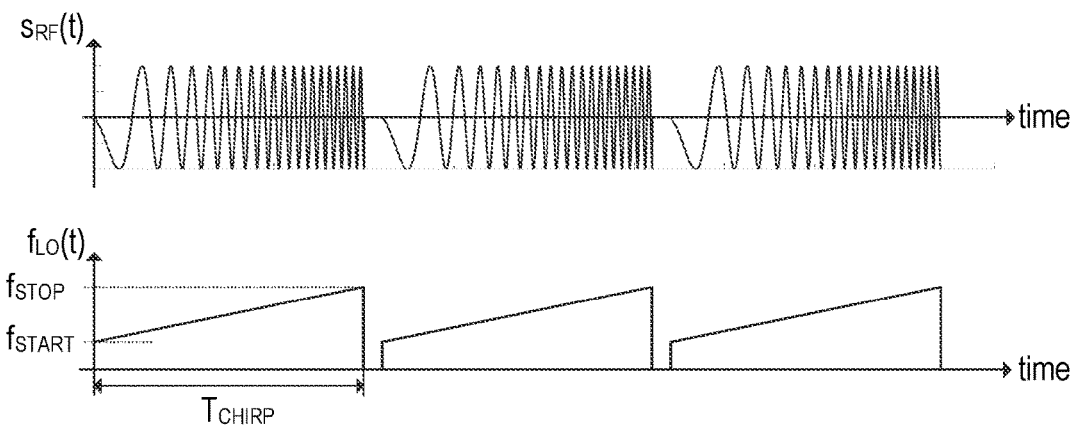
FIG. 2 includes two timing diagrams illustrating the frequency modulation of the RF signal used in FMCW radar systems.

FIG. 2 illustrates the mentioned frequency-modulation of the signal $s_{RF}(t)$. As shown in the top diagram of FIG. 2, the signal $s_{RF}(t)$ is composed of a series of "chirps", e.g., sinusoidal waveforms with increasing (up-chirp) or decreasing (down-chirp) frequency. In the present example, the instantaneous frequency $f_{LO}(t)$ of a chirp increases linearly from a start frequency $f_{START}$ to a stop frequency $f_{STOP}$ within a defined time span $T_{CHIRP}$ (see bottom diagram of FIG. 2). Such a chirp is also referred to as a linear frequency ramp. A linear frequency-modulated (LFM) signal with a sequence of three identical linear frequency ramps is illustrated in FIG. 2. It is noted, however, that the parameters $f_{START}$, $f_{STOP}$, $T_{CHIRP}$ as well as the pause between the individual frequency ramps may vary dependent on the actual implementation of the radar device 1 and may also vary during operation of the radar device. In practice the frequency variation may be, for example, linear (linear chirp, frequency ramp), exponential (exponential chirp) or hyperbolic (hyperbolic chirp).

Figure 3:
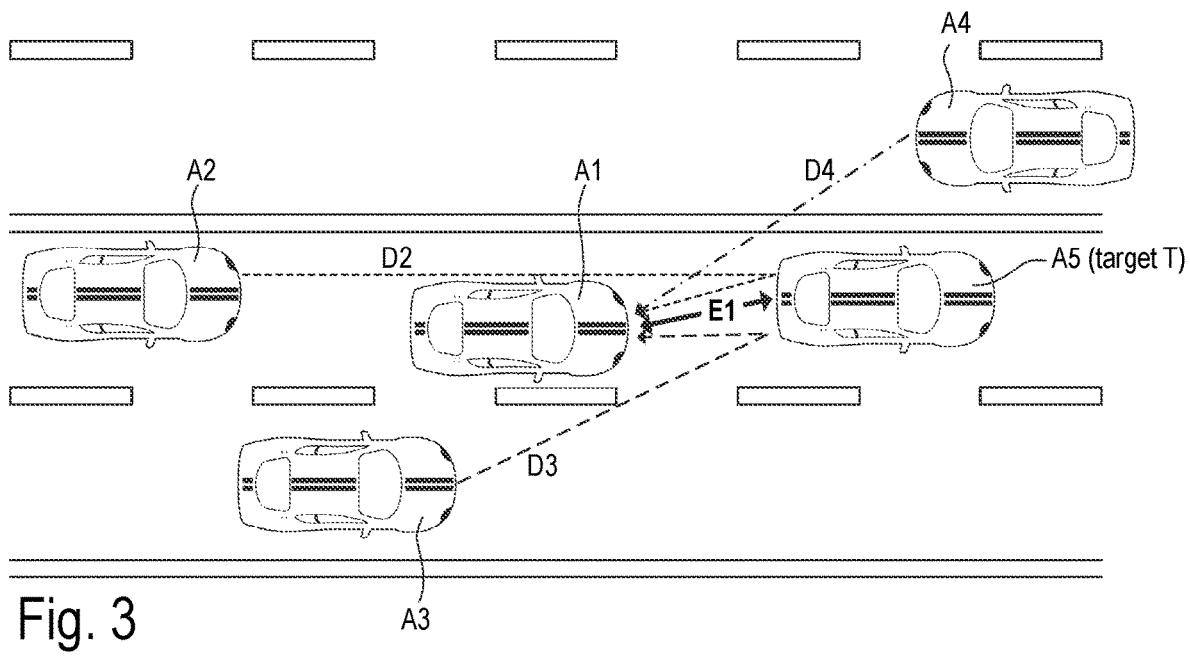
FIG. 3 illustrates one example of how interference is interspersed to the receiver of a radar sensor.

FIG. 3 illustrates one simple example showing how interferers can disturb the operation of a radar sensor. FIG. 3 illustrates a road with three lanes and five vehicles A1, A2, A3, A4, and A5. In the present example, vehicle A1 is considered to be the "own vehicle" (ego vehicle) and its radar sensor as "own radar sensor". The own radar sensor transmits a signal and senses an echo signal E1 back-scattered from vehicle A5, which is the radar target T to be detected by the own radar sensor. However, in addition to the desired echo signal E1, the own radar sensor receives disturbing signals D2, D3, D4 transmitted by the on-board radar sensors of vehicles A2, A3 and A4. These disturbing signals interfere with the desired radar echo E1 and may negatively affect the detection of radar targets from the received radar signal (which includes the echo signal E1 and the disturbing signals D2, D3, and D4).

Figure 4:
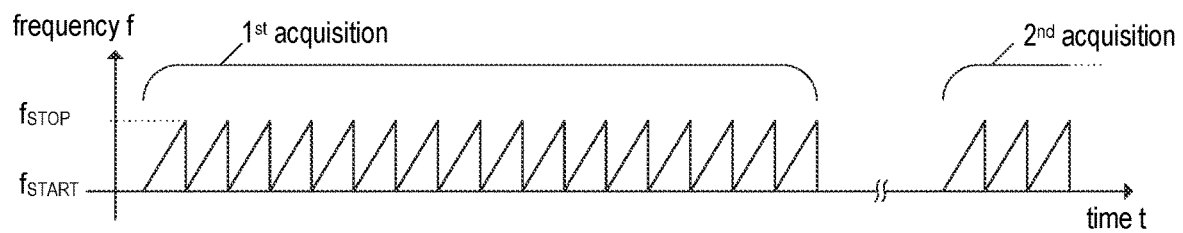
FIG. 4 is a timing diagram illustrating a sequence of chirps used for data acquisition in a radar sensor.

FIG. 4 schematically illustrates an LFM signal with an example FM scheme as may be implemented in FMCW radar sensors. In the depicted example, a sequence of sixteen up-chirps is transmitted for one data acquisition. It is noted that, in practice, a chirp sequence usually includes many more chirps (e.g., 256 chirps) and the present example has been simplified for illustration purposes only. A radar sensor transmits an LFM signal, such as depicted in FIG. 4, and receives a respective radar echo signal. The detection of radar echoes may be performed for each acquisition (e.g., chirp sequence for chirp sequence). Suitable signal processing methods are, for example, Range-Doppler Processing or Range-Doppler Analysis.

Figure 5:
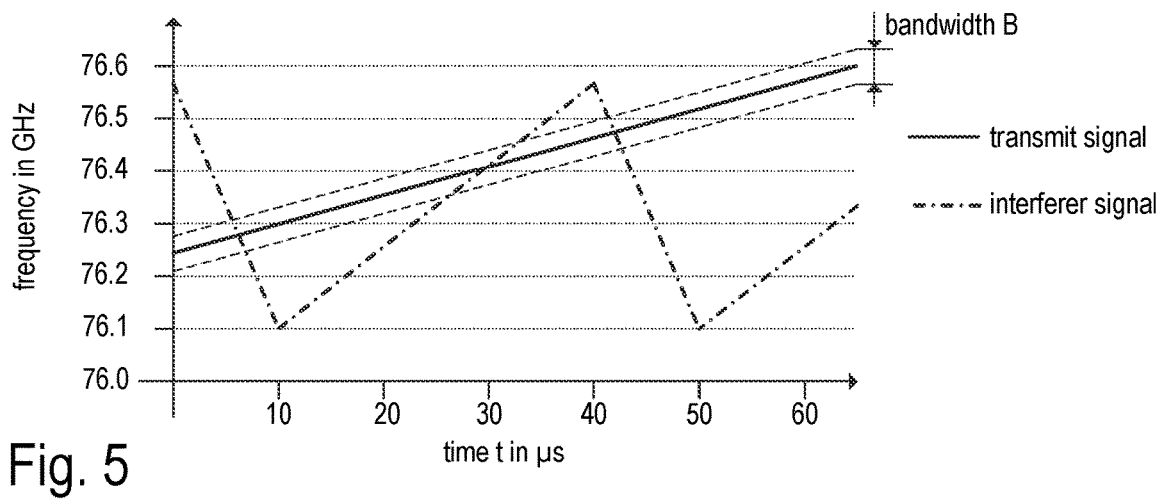
FIG. 5 illustrates in a timing diagram a transmitted signal of a radar sensor and an interference signal from an interferer, wherein the frequency-over-time waveforms of these signals at least partially overlap.
Figure 6:
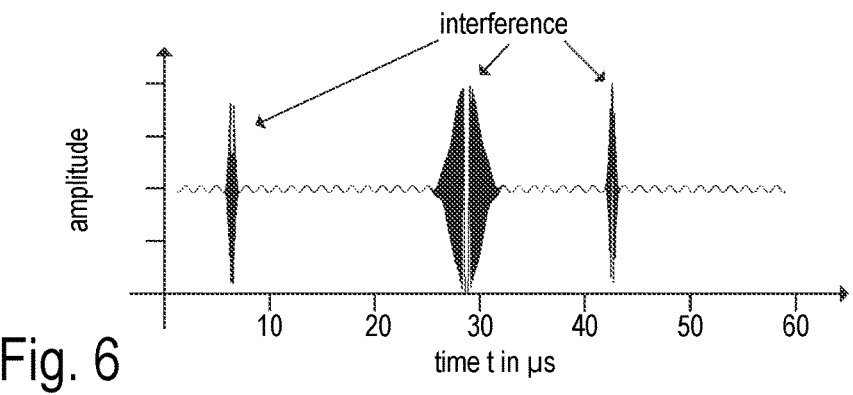
FIG. 6 illustrates one example waveform including a radar signal (after down-conversion to the base band) including a radar echo from a target and interference as shown in FIG. 5.

Dependent on the characteristics of the interfering signals (cf. FIG. 3, signals D2, D3, and D4), the desired radar echoes may be affected in different ways. FIGS. 5 and 6 illustrate examples of how an interferer may disturb the received radar echoes when the interfering signals include chirps that have different parameters, particularly a different frequency slope, than those of the desired radar echoes. FIG. 6 illustrates the frequency over time of one chirp (solid line, chirp duration 60 μs) radiated by the own radar sensor in the example of FIG. 3. The start frequency of the radiated signal $s_{RF}(t)$ is approximately 76250 MHz and the stop frequency is approximately 76600 MHz. An interference signal (e.g., disturbing signal D3 in the example of FIG. 3) generated by another radar sensor includes an up-chirp which starts at approximately 76100 MHz and stops at 76580 MHz (chirp duration 30 μs) and a subsequent down-chirp which starts at the stop frequency of the preceding up-chirp (76580 MHz) and stops at the start frequency of the next up-chirp (76100 MHz), which has a chirp duration of 10 μs. The bandwidth B of the base band signal of the own radar sensor is indicated in FIG. 5 by the dashed lines.

FIG. 6 illustrates an example waveform of the (pre-processed) base band signal resulting from the received radar signal and including a desired radar echo, as well as interference. One can see that the signal components resulting from the interference have a significant magnitude in those time intervals in which the frequency of the interference signal is within the bandwidth B of the radar sensor (see FIG. 5). In the present example, the interference occurs three times during the 60 μs chirp duration, namely at approximately 7 μs, 28 μs and 42 μs (where the chirp slopes shown in FIG. 5 intersect). As mentioned, the power of interference signals is usually higher than the power of radar echoes from real targets. Nevertheless, interferences appear as comparably short bursts whose duration corresponds to the time during which the bandwidths of the signals overlap. Therefore, not all chirps of one acquisition sequence (see FIG. 4) are usually affected by interference. Further, interference signals and the transmitted signal of a specific radar sensor are, in the present example, uncorrelated and thus the interference can be regarded as noise which increases the overall noise floor.

Figure 7:
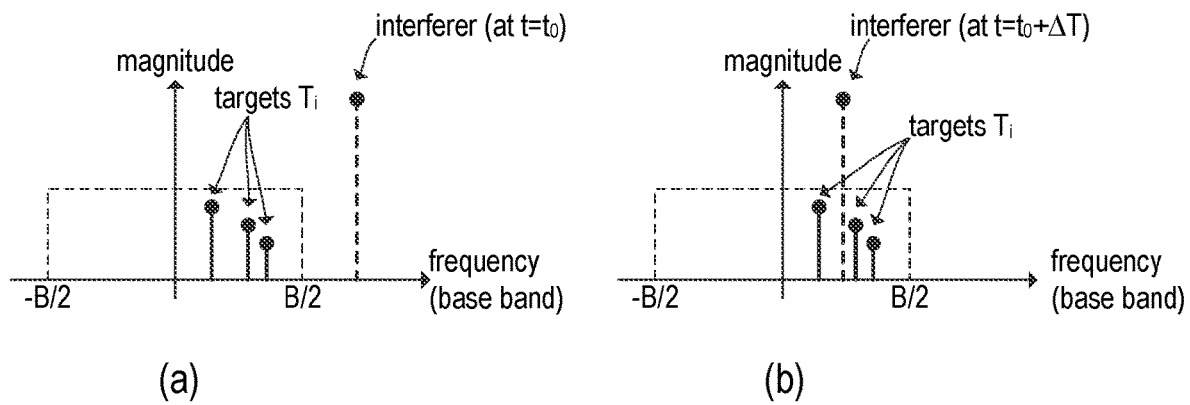
FIG. 7 is a diagram illustrating how interference may affect the detection of radar targets or lead to the detection of so-called "ghost targets".

FIG. 7 illustrates the effect of an interferer on the base-band radar signal in the frequency domain, in which the detection of radar targets is usually performed (e.g., using Range-Doppler Processing). Diagram (a) on the left side of FIG. 7 illustrates three radar targets $T_i$ (i=1, 2, 3) present within the bandwidth B of the baseband of the considered own radar sensor, wherein an interferer is outside the bandwidth B. This situation is similar to the situation that arises at a time $t_0$ of, e.g., 40 μs illustrated in the example of FIG. 5. However, the frequency of the interferer (relative to the frequency of the radar signal radiated by the own radar sensor) changes and the spectral line representing the interferer moves into the frequency band B, causing the interference shown, for example, in FIG. 6. Diagram (b) on the right side of FIG. 7 illustrates this situation in which the interferer signal has moved into the frequency band B of the radar receiver. This situation is similar to the situation that arises at a time $t_0+\Delta T$ of, e.g., 42 μs illustrated in the example of FIG. 5. The examples discussed further below aim to detect the interferer earlier, if possible before the interferer enters the frequency band B of the radar receiver.

Figure 8:
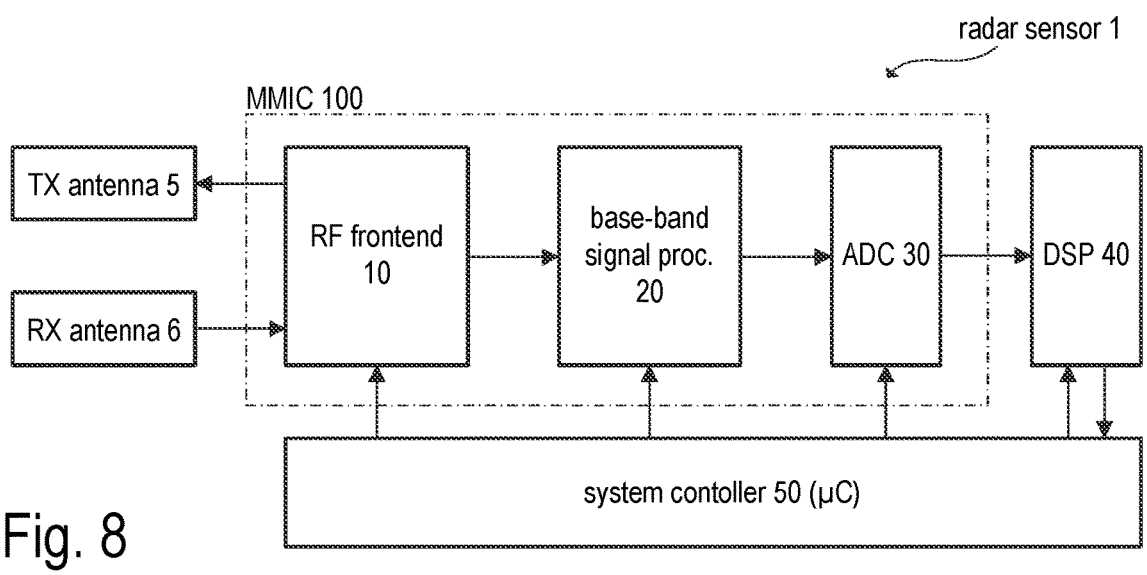
FIG. 8 is a block diagram illustrating the basic structure of an FMCW radar device.

Before discussing the examples in more detail, the generic structure of an example of a radar system will be described. FIG. 8 is a block diagram that illustrates an example structure of radar sensor 1. At least one transmission antenna 5 (TX antenna(s)) and at least one reception antenna 6 (RX antenna(s)) are connected to an RF frontend 10, which may be integrated in a semiconductor chip, usually referred to as monolithic microwave integrated circuit (MMIC) 100. The RF frontend 10 may include all of the circuit components needed for RF signal processing. Such circuit components may include, for example, a local oscillator (LO), RF power amplifiers, low noise amplifiers (LNAs), directional couplers such as rat-race-couplers and circulators, and mixers for the down-conversion of RF signals (e.g. the received signal $y_{RF}(t)$, see FIG. 1) in the base-band or IF-band. As mentioned, antenna-arrays may be used instead of single antennas. The depicted example shows a bistatic (or pseudo-monostatic) radar system, which has separate RX and TX antennas. In the case of a monostatic radar system, a single antenna or a single antenna array may be used for both, receiving and transmitting electromagnetic (radar) signals. In this case a directional coupler (e.g. a circulator) may be used to separate RF signals to be transmitted to the radar channel from RF signals received from the radar channel.

In the case of a frequency-modulated continuous-wave (FMCW) radar sensor, the RF signals radiated by the TX antenna 5 may be in a range of between approximately 20 GHz (e.g. 24 GHz) and 81 GHz (e.g. about 77 GHz in automotive applications. As mentioned, the RF signal received by the RX antenna 6 includes the radar echoes, e.g., the signals that have been back-scattered at the radar target (s). The received RF signal $y_{RF}(t)$ is down-converted into the base band and is further processed in the base-band using analog signal processing (see FIG. 8, base-band signal processing chain 20), which basically includes filtering and amplification of the base-band signal and thus determines the bandwidth of the received signal (cf. FIG. 5, bandwidth B). The base-band signal is finally digitized using one or more analog-to-digital converters 30 and is then further processed in the digital domain (see FIG. 3, digital signal processing chain implemented, e.g., in digital signal processor 40). The overall system is controlled by a system controller 50, which may be at least partly implemented in a processor which can execute appropriate firmware. The processor may be included, e.g., in a microcontroller, a digital signal processor, or the like. The digital signal processor 40 (DSP) may be part of the system controller 50 or separate therefrom. The digital signal processor 40 may be partly implemented using hard-wired or one-time programmable logic circuitry and partly using a processor executing software (firmware). Alternatively, the digital signal processor may be substantially implemented using a processor programmed with software/firmware to perform the functions described herein. It is noted that the components shown in FIG. 8 may, in some examples, be integrated in a single semiconductor chip. For example, the RF frontend 10 and the analog base-band signal processing chain 20 and, in some examples, the ADC 30, the signal processor 40 and the system controller 50 may be integrated into a single MMIC to form a single chip radar system. However, the components may also be distributed among two or more integrated circuits.

Figure 9:
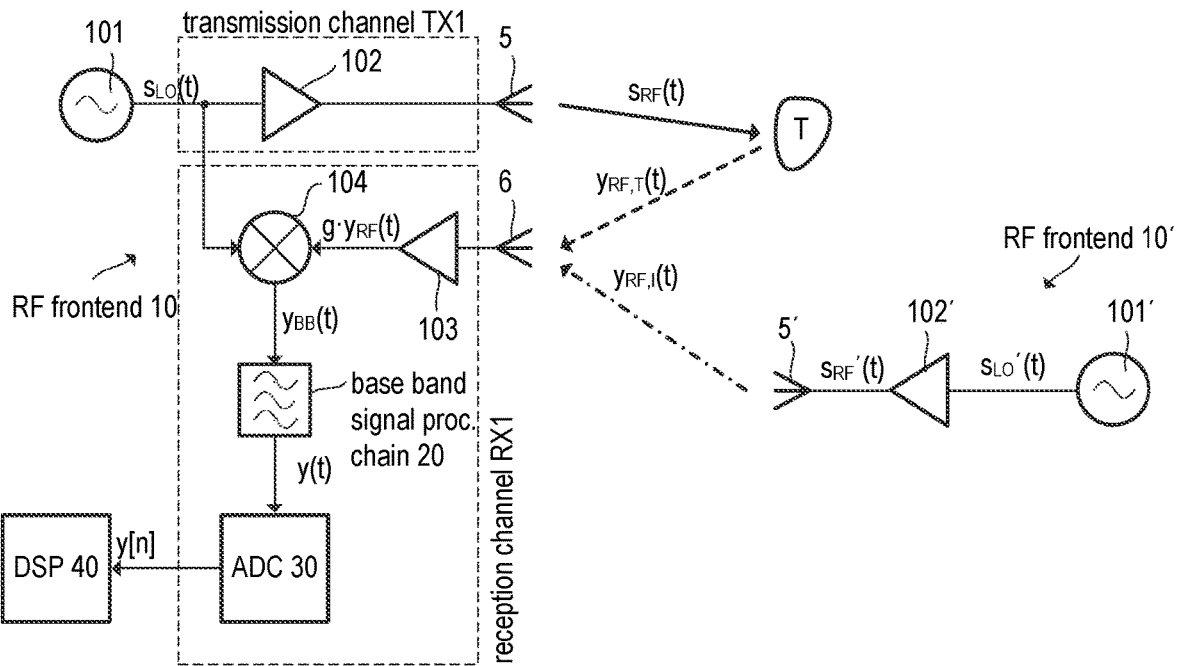
FIG. 9 is a circuit diagram illustrating one example of an analog RF frontend of a radar sensor and an analog RF frontend of an interferer.

FIG. 9 illustrates one example of the RF frontend 10, which may be included in the radar sensor shown in FIG. 8. It is noted that FIG. 9 is a simplified circuit diagram illustrating the basic structure of an RF frontend. Actual implementations, which may depend on the application, may be more complex. In particular, many practical implementations include multiple reception and transmission channels, wherein only one reception channel and one transmission channel is shown in the depicted example in order to keep the illustration simple. The RF frontend 10 includes a local oscillator (LO) 101 that generates a RF signal $s_{LO}(t)$, which may be frequency-modulated as explained above with reference to FIGS. 2 and 4. The signal $s_{LO}(t)$ is also referred to as LO signal). In radar applications, the LO signal is usually in the SHF (Super High Frequency) or the EHF (Extremely High Frequency) band, e.g. between 76 GHz and 81 GHz in automotive applications.

The LO signal $s_{LO}(t)$ is processed in the transmitted signal path (transmission channel, TX channel), as well as in the receive signal path (reception channel, RX channel). The transmit signal $s_{RF}(t)$, which is radiated by the TX antenna 5, is generated by amplifying the (frequency-modulated) LO signal $s_{LO}(t)$, e.g., using an RF power amplifier 102. The output of the amplifier 102 is coupled to the TX antenna 5 e.g., via strip lines, a coupler, matching network, etc. (not shown in FIG. 9). The received signal $y_{RF}(t)$, which is provided by the RX antenna 6, is provided to a mixer 104. In the present example, the received signal $y_{RF}(t)$ (e.g. the antenna signal) is pre-amplified by RF amplifier 103 (e.g. by a low-noise amplifier, LNA, with gain g), so that the mixer receives the amplified signal $g \cdot y_{RF}(t)$ at its RF input. The mixer 104 further receives the frequency-modulated LO signal $s_{LO}(t)$ at its reference input and is configured to down-convert the amplified signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 8), which basically includes one or more filters (e.g. a band-pass or a low-pass) for removing undesired side bands and image frequencies, as well as one or more amplifiers. The analog output signal of the base-band signal processing chain 20 is denoted as y(t) and may be supplied to an analog-to-digital converter (ADC) 30 (see also FIG. 8). The digital signal y[n] output by the ADC 30 is referred to as digital radar signal and includes the digital radar data. The digital radar signal may be supplied to a processor such as digital signal processor 40, which is programmed to further process the digital radar signal, e.g. by applying algorithms summarized as Range/Doppler processing.

FIG. 9 also illustrates how a desired radar echo and a radar signal transmitted by another radar sensor interfere with each other. FIG. 9 further shows the radar frontend 10' of a further radar sensor, wherein only the local oscillator 101' and the transmission channel (including amplifier 102') and the transmission antenna 5' are shown in order to keep the illustration simple. The further radar sensor radiates a signal $s_{RF}'(t)$. The resulting RF signal arriving at the reception antenna 6 of the first radar sensor is denoted as RF interference signal $y_{RF,I}(t)$. The reception antenna 6 of the first radar sensor receives the RF interference signal $y_{RF,I}(t)$ together with the desired RF echo signal $y_{RF,T}(t)$ caused by the radar target T at which the signal $s_{RF}(t)$ radiated by the first radar sensor is back-scattered.

Both, the radar echo $y_{RF,T}(t)$ and the interference signal $y_{RF,I}(t)$ are received by the antenna 6 and superpose each other at the RF input of mixer 104 ($y_{RF}(t)=y_{RF,T}(t)+y_{RF,I}(t)$). It can be seen from FIG. 9 that the interference signal component $y_{RF,I}(t)$ of the received signal $y_{RF}(t)$ is down-converted into the base band in the same way as radar echoes $y_{RF,T}(t)$ included in the received signal $y_{RF}(t)$. Accordingly, when the frequency difference between the instantaneous frequency $f_{LO}$ of the transmit signal $s_{RF}(t)$ and the instantaneous frequency of the received interference signal $y_{RF,I}(t)$ lies within the bandwidth B of the base-band signal processing chain 20, interference will also be present in the digital signal y[n].

Figure 10:
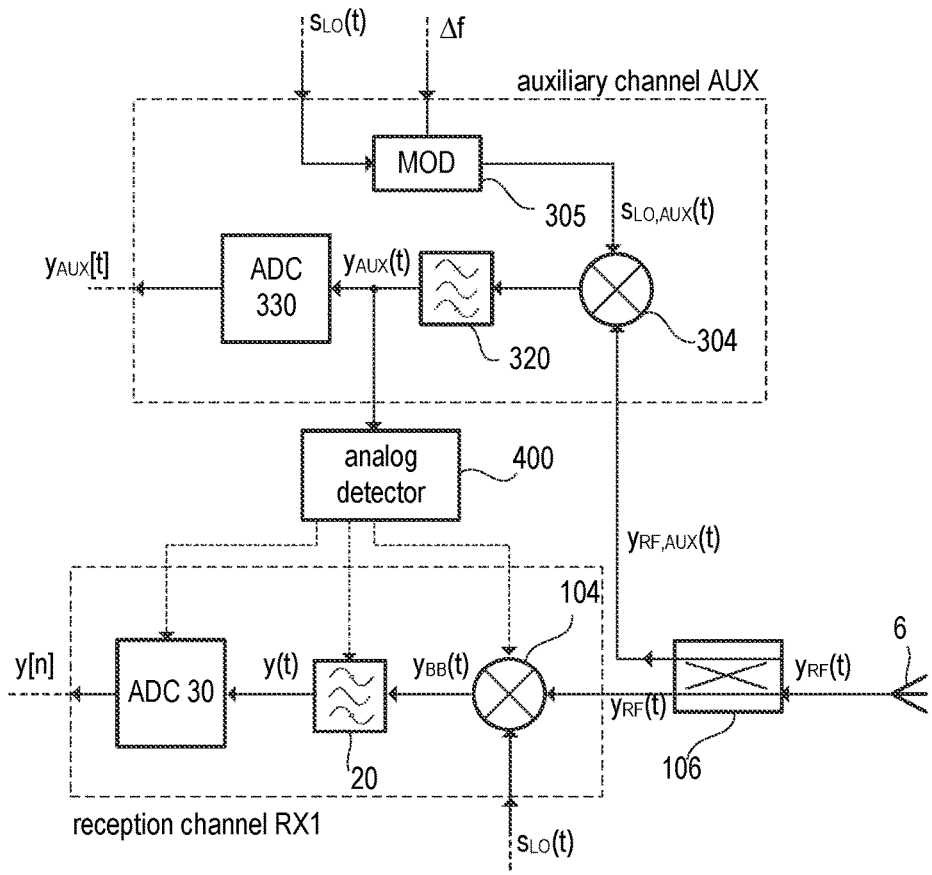
FIG. 10 is a circuit diagram illustrating one example of an RF frontend with an auxiliary channel for detecting an interferer signal.

Various approaches to mitigate or cancel interference are known. However, in order to mitigate or cancel interferer signal components, the presence of an interferer signal component needs first to be detected. FIG. 10 illustrates a first example which allows, at least in some situations, the detection of an interferer signal component generated outside of the MIMIC (e.g. by another radar system) and received by a reception antenna before the signal is (e.g. digitally) processed in the baseband.

The circuit of FIG. 10 illustrates a reception channel RX1 with a mixer 104 that receives the LO signal $s_{LO}(t)$ generated by the local oscillator and an RF signal $y_{RF}(t)$ received by antenna 6. The resulting baseband signal $y_{BB}(t)$ is further processed by the analog base band signal processing chain 20, and the analog output signal y(t) of the base-band signal processing chain 20 is supplied to ADC 30. In the depicted example, the reception channel RX1 is basically identical to the example of FIG. 9, except that the LNA 103 has been omitted (in order to keep the illustration simple) and a directional coupler 106 is inserted between the antenna port and the RF input of the reception channel RX1, which corresponds to the RF input port of the mixer 104 in the depicted example. The directional coupler 106 is configured to direct the signal $y_{RF}(t)$ received from antenna 109 to the mixer 104 and to divert a portion of the received signal power of signal $y_{RF}(t)$ to an additional auxiliary channel AUX. That is, the auxiliary channel is connected to the reverse signal port of the coupler at which the signal incident at the antenna port is output. The signal diverted from the reception channel RX1 is denoted as $y_{RF,AUX}(t)$ in FIG. 10. In some examples, the directional coupler 106 is configured to operate and couple RF signals in the range above 24 GHz, e.g. in the range of 76 to 81 GHz or above.

The auxiliary channel AUX is constructed to receive and process RF signals similarly to other reception channels of the MIMIC 100 (e.g. reception channel RX1) and therefore also includes a signal processing chain of a mixer 304, an analog base-band signal processing chain 320 and an ADC 330 configured to digitize the base-band signal $y_{AUX}(t)$ provided by the signal processing chain 320 at its output. The bandwidth of the signal processing chain 320 may be the same as the bandwidth B of the signal processing chain 20 of the reception channel RX1.

The mixer 304 receives, at the RF port of the mixer, the RF signal $y_{RF,AUX}(t)$ diverted from the reception channel RX1 by the coupler 106. Different from a "normal" reception channel, a frequency shifted LO signal $s_{LO,AUX}(t)$ is supplied to the reference port of mixer 304 and used to down-convert the RF signal $y_{RF,AUX}(t)$ into the base band according to one example. The frequency of the LO signal $s_{LO}(t)$ is $f_{LO}$, whereas the frequency of the frequency-shifted (auxiliary) LO signal $s_{LO,AUX}(t)$ is $f_{LO}+\Delta f$.

The frequency shifted LO signal $s_{LO,AUX}(t)$ can be generated based on LO signal $s_{LO}(t)$ by modulating the LO signal $s_{LO}(t)$ with a sinusoidal signal that has a frequency equal to the frequency offset $\Delta f$. Therefore, in the present example, the auxiliary channel AUX includes a modulator 305, which receives the LO signal $s_{LO}(t)$ and is configured to modulate the LO signal $s_{LO}(t)$ using a modulation signal which has a frequency equal to the frequency offset $\Delta f$. The output signal of the modulator 305 is the frequency shifted LO signal $s_{LO,AUX}(t)$. Suitable modulators are known and thus not discussed herein in greater detail. In one example, the modulator is an IQ-modulator. The frequency offset $\Delta f$ between the signals $s_{LO}(t)$ and $s_{LO,AUX}(t)$ may be positive or negative. As a consequence, the frequency bands (e.g. of band width B) of the digital output signals y[n] and $y_{AUX}[n]$ of the reception channel RX1 and, respectively, the auxiliary channel AUX, have a frequency offset equal to $\Delta f$.

Figure 11:
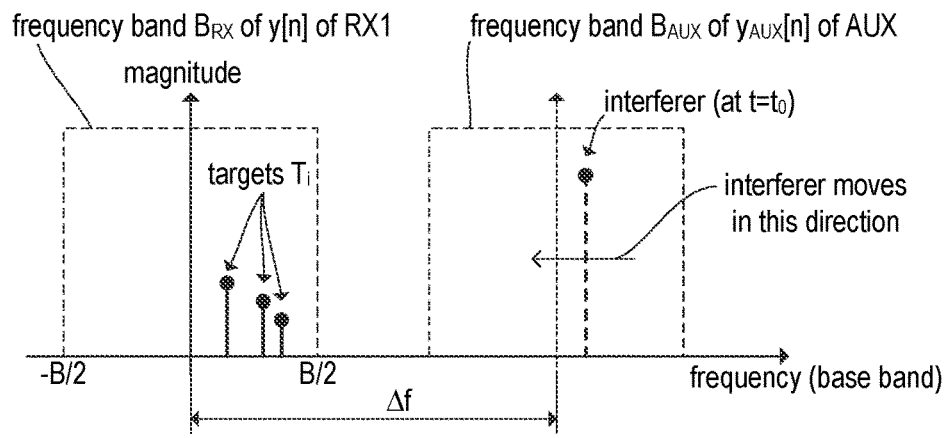
FIG. 11 is a diagram visualizing, in a spectrum, function and purpose of the auxiliary channel in the example of FIG. 10.

The diagram of FIG. 11 illustrates the effect of the frequency offset $\Delta f$. Similar to diagram (a) of FIG. 7, FIG. 11 illustrates the digital output signal y[n] of reception channel RX1, which includes three radar targets $T_i$ (i=1, 2, 3) in a frequency band $B_{RX}$ of bandwidth B, which is basically determined by the band-pass characteristics of the analog signal processing chain 20 (cf. FIG. 10). FIG. 11 also shows a spectral line illustrating an interferer signal, which is outside of the frequency band $B_{RX}$ and thus does not (yet) affect the digital radar signal y[n] and the detection of the radar targets $T_i$. However, for FMCW, the interferer (to be precise: the spectral line caused by the interferer signal) is "moving" towards the frequency band $B_{RX}$ and will disturb the digital radar signal y[n] some short time later.

However, the output signal $y_{AUX}[n]$ of the auxiliary channel AUX is in the frequency band $B_{AUX}$ which has also the bandwidth B but is frequency shifted (with respect to the frequency band $B_{RX}$) by the frequency offset $\Delta f$. Accordingly, the interferer signal is detectable in the signal $y_{AUX}[n]$ while being absent from (and thus not detectable in) the output signal y[n] of reception channel RX1 in the depicted situation. Therefore, the presence of an interferer can be detected using the signal $y_{AUX}(t)$ or its digital representation $y_{AUX}[n]$. In one example the frequency offset $\Delta f$ is approximately B/2, e.g. half the bandwidth of the frequency bands $B_{RX}$ and $B_{AUX}$. It is understood that the auxiliary channel AUX may be constructed such that the bandwidth of the frequency band $B_{AUX}$ is greater than the bandwidth of the frequency band $B_{RX}$. Further, it is noted that the requirements concerning linearity (e.g. linearity of the ADC) may be less strict for the auxiliary channel AUX than the requirements for a normal reception signal, where linearity is paramount for a precise detection of radar targets. Therefore, in the examples the auxiliary channel is not a copy of the reception channel, although the same functional components (e.g. ADCs 30, 330, Filters 20, 320) may be implemented in the auxiliary channel AUX and reception channel. In some examples, the auxiliary channel may take up less area on the silicon chip.

Referring again to FIG. 10, the depicted circuit includes an analog detector circuit 400 which is configured to detect an interferer signal (cf. FIG. 11) based on the analog signal $y_{AUX}(t)$ provided at the output of the analog signal processing chain 320. For this purpose, the analog detector circuit 400 may use one or more threshold values to detect an interferer in the time domain. Upon detection of an interferer that is moving towards the frequency band $B_{RX}$, the detector circuit 400 may modify the characteristics of one or more of the following elements of the reception channel RX1: the mixer 104, the signal processing chain 20, and the ADC 30. For example, the detector circuit 400 may modify the gain of the mixer 104. With a reduced gain the mixer 104 is less likely to saturate. A saturated mixer output makes detection of a radar target almost impossible, wherein detection of a target may still be possible in the presence of an interferer if saturation is avoided.

It should be noted that, due to the frequency offset $\Delta f$ discussed above, the detector circuit 400 is able to "look" ahead for a short period of time, which, however, is sufficiently long for the analog detector circuit to react and trigger suitable countermeasures such as, for example, reducing the gain of the mixer 104. According to one example, in which the RF chirps have a steepness of 20 MHz/μs, a frequency offset $\Delta f$ of 20 MHz is necessary for a look-ahead time of 1 μs. In one example, the bandwidth B of the reception channel RX1 is equal to $\Delta f$ (e.g. B=$\Delta f$=20 MHz).

Figure 12:
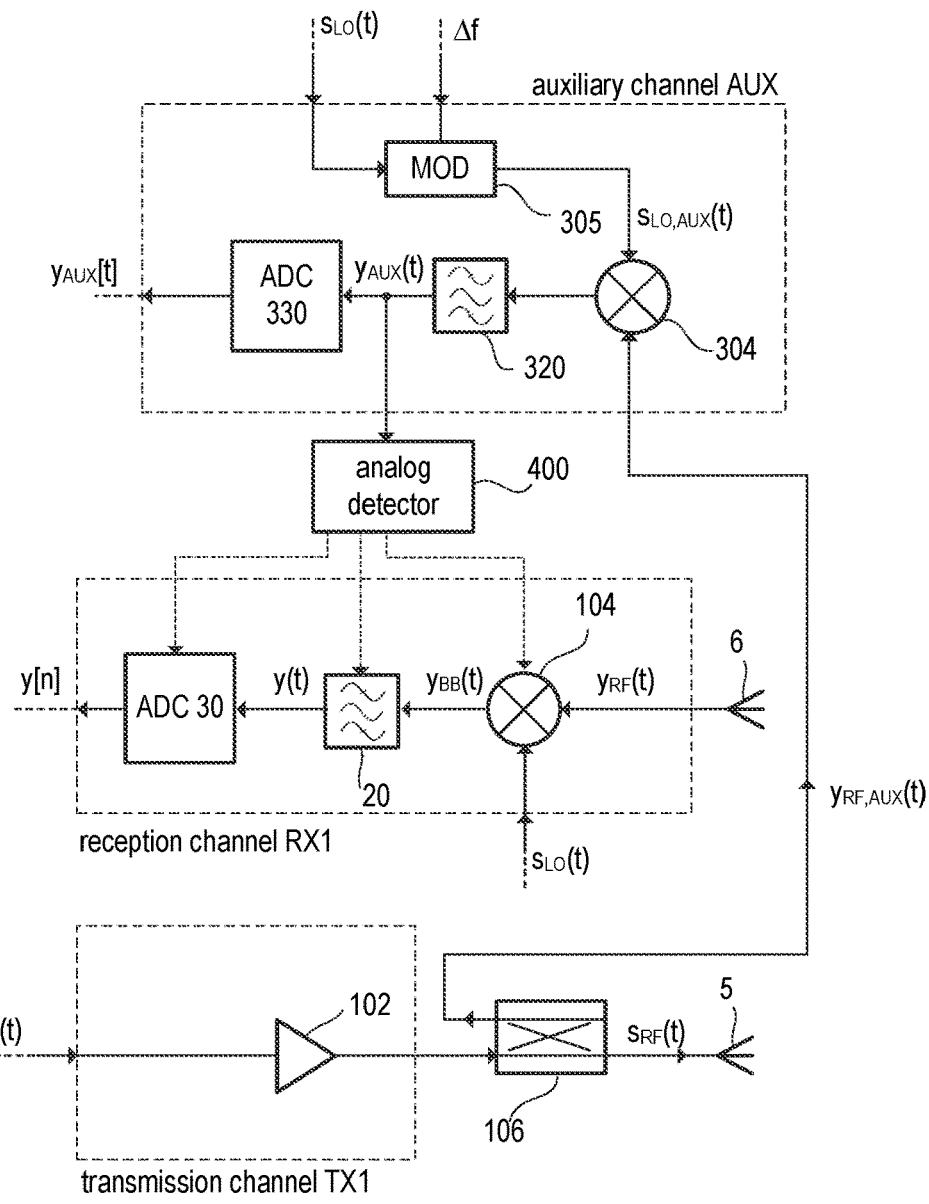
FIG. 12 is a circuit diagram illustrating another example of an RF frontend with an auxiliary channel for detecting an interferer signal.

FIG. 12 is a circuit diagram illustrating another example of an RF frontend with an auxiliary channel AUX for detecting an interferer signal. The present example is very similar to the previous example of FIG. 10. However, according to FIG. 5, the RF input signal $y_{RF,AUX}(t)$ of the auxiliary channel AUX is diverted from the antenna port of the transmission channel TX1 (using a directional coupler) instead of from the antenna port of the reception channel RX1 (as it is the case in FIG. 10).

In the example of FIG. 12, the directional coupler 106, which may be, for example, a rat-race coupler, a circulator, or the like, is connected between the RF output of the transmission channel TX1 of the radar device and the respective transmission antenna 5. The transmission channel TX1 also includes the RF power amplifier 102 (cf. FIG. 9) for amplifying the LO signal $s_{LO}(t)$ which is then directed to the antenna port by the directional coupler 106. The transmission antenna 5 is connected to the antenna port of the transmission channel and radiates the radar signal $s_{RF}(t)$ (amplified LO signal).

Although the transmission antenna 5 is configured for and operates by transmitting signals, an interferer signal (cf. signal $y_{RF,I}(t)$ in FIG. 9) can be received by the transmission antenna 5, as can any other RF signal. Different from other implementations, the signal received from the transmission antenna 5 is not dissipated in a termination resistance but is directed to the auxiliary channel AUX by the directional coupler 106. The received signal diverted from the transmission channel TX1 and received by the auxiliary channel is denoted as $y_{RF,AUX}(t)$. The auxiliary channel RX1 and the analog detector 400 operate in the same way as described above in connection with the previous example of FIG. 10 and reference is made to the respective description.

Irrespective of the specific implementation (e.g. according to FIG. 10 or 12), the auxiliary channel AUX (auxiliary receiver) may differ from normal reception channels in some aspects. For example, normal reception channels such as the reception channel RX1 need to be configured for a high linearity in order to allow for a precise detection of radar targets. As the coupler 106 (see FIG. 10 or 12) attenuates the interferer signal by approximately 15 dB, the linearity requirements for the auxiliary channel can be lowered significantly. Furthermore, the auxiliary channel can be configured to have a significantly lower dynamic range than a normal reception channel because the detection of very small signals is not required for interference detection. Moreover, the requirements concerning the signal to noise ratio at the output of the auxiliary channel are also significantly laxer than a normal reception channel. The laxer requirements for the auxiliary receiver allow for the integration of the auxiliary channel into a relatively small chip area (as compared to a normal reception channel). Accordingly, the auxiliary channel AUX will usually be integrated in the same MMIC as the normal reception channel(s). However, in some examples the auxiliary channel AUX may be implemented in a separate chip.

As can be seen in FIGS. 10-12, the auxiliary channel AUX can be operated concurrently (operating at the same time) to the normal reception channel(s). That is, the detection of radar targets and the detection of interferer signals can be achieved in parallel (at the same time). As discussed above, the frequency offset $\Delta f$ introduced by the modulator in the auxiliary channel (see FIGS. 10 and 12, modulator 305) allows for an early detection of an interferer signal shortly before it disturbs/distorts the signal received by the normal reception channel(s). The achievable "look-ahead" time is proportional to the frequency offset $\Delta f$. This look-ahead time allows the analog detector 400 to react before the interferer impairs the radar target detection. In some implementations, the frequency offset $\Delta f$ may be configurable or programmable, which allows for more flexibility in the implementation.

In addition, or as an alternative to, the analog detector 400, the digital output signal $y_{AUX}[n]$ may be processed using, e.g. the digital signal processor 40 (cf. FIG. 8)) in order to detect interferer signals. The digital signal processing for detecting interferer signals allows, for example, for the use of cognitive signal processing for the tracking and prediction of interferer signals. That is, the radar system can "learn" in which frequency bands interferences typically occur in specific situations, how often interferences occur, from which direction interferences are incident, etc. Additionally or alternatively, digital signal processing may be used to measure, based on the digital output signal $y_{AUX}[n]$ of the auxiliary channel AUX, at which power levels and for which duration a specific chirp is affected. Based upon this information, different interference mitigation techniques can be applied (e.g. discarding the whole chirp in the worst case or only making minor corrections to the chirp data in the best case).

As mentioned, the auxiliary channel AUX and the reception channel RX1 can be operated simultaneously to concurrently detect interferer signals and radar targets. In another example, the auxiliary channel AUX is operated during the idle times of the reception channel RX1, e.g. between two subsequent acquisition sequences (see FIG. 4, the time span between chirp sequences is labeled "$1^{st}$ acquisition" and "$2^{nd}$ acquisition"). Accordingly, the radar sensor can make use of an approach in which the radar channel is monitored for interference during idle times before an acquisition is started.

Figure 13:
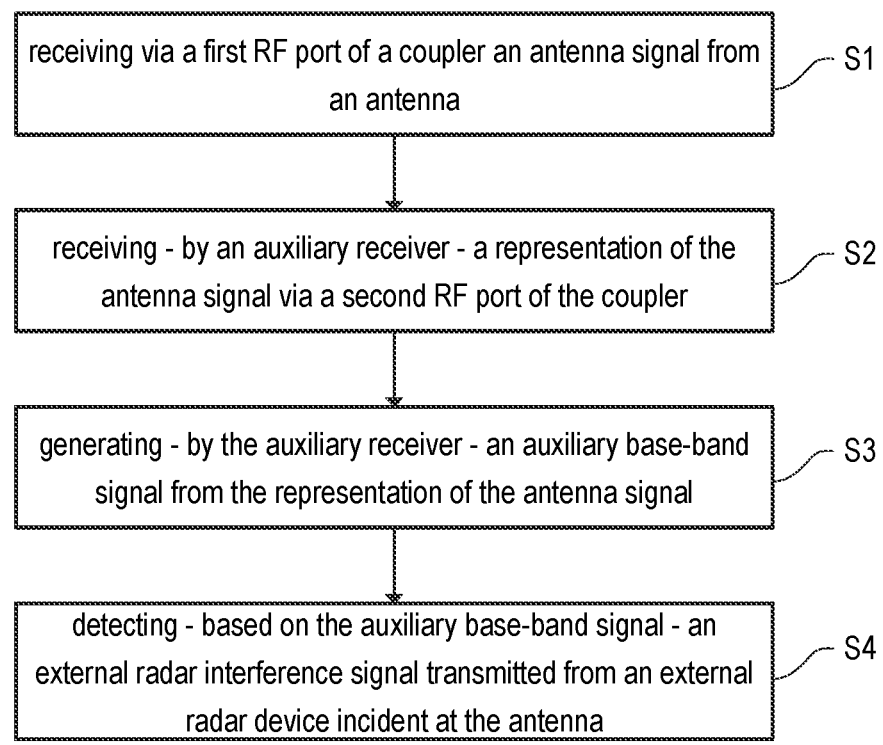
FIG. 13 is a flow-chart illustrating one example of a method for a radar system.

In the following, the various approaches and techniques implemented in the examples described herein are summarized. It is, however, emphasized that the following is not an exhaustive list of technical features but rather an example summary. A method for a radar system is illustrated in the flow chart in FIG. 13. Accordingly, the method includes receiving—via a first RF port of a coupler (see, e.g. FIG. 10 or 12, coupler 106)—an antenna signal $y_{RF}(t)$ from an antenna (FIG. 13, step S1). The method further includes receiving—by an auxiliary receiver (see, e.g. FIG. 10 or 12, auxiliary receiver AUX)—a representation of the antenna signal (e.g., FIG. 10 or 12, signal $y_{RF,AUX}(t)$) via a second RF port of the coupler (FIG. 13, step S2) and generating—by the auxiliary receiver—an auxiliary base-band signal from the representation of the antenna signal (FIG. 13, step S3). Based on the auxiliary base-band signal (see, e.g., FIG. 10 or 12, signal $y_{AUX}(t)$), an external radar interference signal transmitted from an external radar device incident at the antenna is detected (FIG. 13, step S4).

In one example, an LO signal is generated e.g. by a local oscillator, and a frequency-shifting of the LO signal is performed by modulating the LO signal with a modulation signal which has a frequency equal to an offset frequency $\Delta f$ (cf. FIG. 10 or 12, modulator 305). Generating the auxiliary base-band signal (cf. FIG. 13, step S3) may include demodulating the mentioned representation of the antenna signal by mixing it with the frequency-shifted LO signal (cf. FIG. 10 or 12, mixer 304).

In one example, the method includes receiving—in a reception channel (see e.g. FIG. 10 or 12, channel RX1) of the radar system—a further representation of the antenna signal via a third RF port of the coupler. In one example, the method includes generating—in a transmission channel (see e.g. FIG. 12, channel TX1) of the radar system—an RF output signal based on the LO signal, wherein the RF output signal is supplied to a third port of the coupler (see FIG. 12, coupler 106) which directs the RF output signal to the antenna.

In the examples described herein, the signal power of the representation of the antenna signal received at the RF input of the reception channel (see e.g. FIG. 10, channel RX1) is greater than a signal power of the representation of the antenna signal received by the auxiliary receiver ((see e.g. FIG. 10, auxiliary channel AUX).

The detection of an external radar interference signal (see FIG. 13, step 4) may be performed using an analog circuit which has a control output coupled to the reception channel (see e.g., FIG. 10 or 12, channel RX1), wherein the analog circuit may be configured to adjust the gain of one or more circuit components of the reception channel upon the detection of an interference.

Although the implementation has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure which performs the specified function of the described component (e.g., that is functionally equivalent), even though not structurally equivalent to the disclosed structure which performs the function in the herein illustrated example implementations of the implementation.

What is claimed is:

1. A radar system, comprising:
a radio frequency (RF) coupler having a first RF port for receiving an RF antenna signal from an antenna, a second RF port configured to output a representation of the RF antenna signal, and a third RF port configured to output a further representation of the RF antenna signal;
a reception channel including a first mixer coupled to the third RF port and configured to generate a receiver base-band signal based on the further representation of the RF antenna signal;
an auxiliary receiver having an RF input coupled to the second RF port of the RF coupler, the auxiliary receiver includes a second mixer configured to receive the representation of the RF antenna signal and configured to generate an auxiliary base-band signal based on the representation of the RF antenna signal; and
a detection circuit configured to detect, based on the auxiliary base-band signal, an external radar interference signal transmitted from an external radar device incident at the antenna.

2. The radar system of claim 1, further comprising:
a modulator configured to generate a first RF signal by frequency-shifting a local oscillator (LO) signal by an offset frequency,
wherein the second mixer is configured to generate the auxiliary base-band signal based on the first RF signal.

3. The radar system of claim 1, further comprising:
a transmission channel configured to receive a local oscillator (LO) signal, to generate an RF output signal based on the LO signal, and to output the RF output signal at an RF output of the transmission channel.

4. The radar system of claim 3,
wherein the third RF port of the RF coupler is coupled to the RF output of the transmission channel, and
wherein the RF coupler is configured to direct the RF output signal to the antenna.

5. The radar system of claim 1,
wherein the third RF port of the RF coupler is coupled to an RF input of the reception channel that is configured to receive, from the third RF port of the RF coupler, the further representation of the RF antenna signal, and
wherein the first mixer is configured to generate the receiver base-band signal from the further representation of the RF antenna signal using a local oscillator (LO) signal.

6. The radar system of claim 5,
wherein a signal power of the further representation of the RF antenna signal received at the RF input of the reception channel is greater than a signal power of the representation of the RF antenna signal received by the auxiliary receiver.

7. The radar system of claim 1,
wherein the detection circuit is an analog circuit having a control output coupled to a reception channel, the analog circuit being configured to adjust a gain of one or more circuit components of the reception channel in response to detecting the external radar interference signal.

8. The radar system of claim 1,
wherein the auxiliary receiver includes an analog-to-digital converter configured to digitize the auxiliary base-band signal to produce a digitized auxiliary base-band signal, and
wherein the detection circuit includes a digital signal processing circuit configured to detect an interference based on the digitized auxiliary base-band signal.

9. The radar system of claim 7, wherein the analog circuit is configured to, in response to detecting the external radar interference signal, adjust at least one of a gain an RF amplifier of the reception channel or a gain of the first mixer of the reception channel.

10. The radar system of claim 1, wherein the detection circuit is configured to, in response to detecting the external radar interference signal, adjust a gain of the first mixer of the reception channel such that the first mixer is less likely to saturate.

11. The radar system of claim 1, wherein the detection circuit is configured to, in response to detecting the external radar interference signal, adjust a characteristic of one or more components of the reception channel, the one or more components including the first mixer, one or more components of a signal processing chain, or an analog-to-digital converter (ADC).

12. The radar system of claim 1, wherein the first mixer is configured to convert the further representation of the RF antenna signal into the receiver base-band signal using a first local oscillator (LO) signal,
wherein the second mixer is configured to convert the representation of the RF antenna signal into the auxiliary base-band signal using a second LO signal that has a frequency offset relative to the first LO signal, and
wherein the frequency offset enables the detection circuit to detect the external radar interference signal.

13. The radar system of claim 12, wherein the frequency offset enables the detection circuit to detect the external radar interference signal prior to the radar system using the receiver base-band signal for radar target detection.

14. The radar system of claim 1, wherein the reception channel includes:
a first base-band signal processing chain coupled to an output of the first mixer and configured to process the receiver base-band signal; and
a first analog-to-digital converter (ADC) coupled to an output of the first base-band signal processing chain, and
wherein the auxiliary receiver includes:
a second base-band signal processing chain coupled to an output of the second mixer and configured to process the auxiliary base-band signal; and
a second ADC coupled to an output of the second base-band signal processing chain.

15. The radar system of claim 14, wherein the detection circuit is coupled to the output of the second base-band signal processing chain.

16. The radar system of claim 14, wherein the detection circuit is coupled to an output of the second ADC.

17. A method for a radar system, the method comprising:
receiving, via a first radio frequency (RF) port of a coupler, an antenna signal from an antenna;
receiving, by an auxiliary receiver, a representation of the antenna signal via a second RF port of the coupler;
receiving, by a reception channel, a further representation of the antenna signal via a third RF port of the coupler;
generating, by a first mixer of the reception channel, a receiver base-band signal from the further representation of the antenna signal;
generating, by a second mixer of the auxiliary receiver, an auxiliary base-band signal from the representation of the antenna signal; and
detecting, by a detector circuit, based on the auxiliary base-band signal, an external radar interference signal transmitted from an external radar device incident at the antenna.

18. The method of claim 17, further comprising:
generating a local oscillator (LO) signal; and
frequency-shifting the LO signal, by modulating the LO signal with a modulation signal having a frequency equal to an offset frequency, to generate a frequency-shifted LO signal.

19. The method of claim 18, wherein generating the auxiliary base-band signal comprises:
demodulating the representation of the antenna signal by mixing the representation of the antenna signal with the frequency-shifted LO signal.

20. The method of claim 17, further comprising:
generating, by a transmission channel, an RF output signal based on a local oscillator (LO) signal,
wherein the RF output signal is supplied to the third RF port of the coupler, which directs the RF output signal to the antenna.

21. The method of claim 17, further comprising:
digitizing the auxiliary base-band signal to produce a digitized auxiliary base-band signal, wherein detecting the external radar interference signal includes processing the
digitized auxiliary base-band signal.

22. The method of claim 17, further comprising:
adjusting, based on detecting the external radar interference signal, a gain of one or more circuit components of the reception channel.

* * * * *